United States Patent Office 3,803,104
Patented Apr. 9, 1974

3,803,104
HIGH MOLECULAR WEIGHT AND LOW VISCOSITY VINYLPYRROLIDONE POLYMER FLOCCULANTS AND CATALYST AND PROCESS PRODUCING THE SAME
Eugene S. Barabas, Watchung, and Frederick Grosser, Midland Park, N.J., assignors to GAF Corporation, New York, N.Y.
No Drawing. Filed Dec. 23, 1971, Ser. No. 211,733
Int. Cl. C08f 15/40
U.S. Cl. 260—80.72         4 Claims

ABSTRACT OF THE DISCLOSURE

Novel solution tetrapolymer compositions consisting of monomer units of N-vinyl-2-pyrrolidone, acrylamide, methacrylamide, and an N-alkylamino-ester of an ethylenically unsaturated acid which are suitable for use as flocculants having a high molecular weight and low shear viscosity are produced in the presence of an inorganic free radical catalyst such as tetrapotassium peroxy diphosphate.

---

This invention relates to novel polyvinylpyrrolidone tetrapolymers suitable for use as flocculants.

More particularly, this invention relates to a novel process and catalyst for producing vinylpyrrolidone tetrapolymer flocculants in good yield.

Most prior art polymeric flocculating agents generally rely upon their high molecular weight for their flocculating activity. However, these high molecular weight prior art flocculating agents also normally have a high shear viscosity which creates problems in handling, storing, and utilizing these materials.

Furthermore, while prior free radical catalysts generally produce suitable products, these catalysts are economically disadvantageous due to their high cost and the cost of special apparatus and containers necessary for shipping and storing the same. Also, high molecular weight polymers produced by using these prior art catalysts generally have high shear viscosity.

Briefly, it has been found that these disadvantages of prior art flocculating agents and catalysts for producing the same have been overcome by the novel tetrapolymers of vinylpyrrolidone of the present invention which excellent flocculating activity while at the same time having an essentially low shear viscosity so that these tetrapolymers are easily handled and stored. Furthermore, it has been found that the use of a specific free radical catalyst, i.e., tetrapotassium peroxy diphosphate, produces these high molecular weight, low shear viscosity tetrapolymers in good yield while at the same time the catalyst is inexpensive and does not require expensive procedures and equipment for shipping and storage.

It is, therefore, the principal object of the present invention to provide novel flocculating compounds having improved viscosity properties.

It is a further object of the present invention to provide a novel vinylpyrrolidone tetrapolymer having a high molecular weight and a low shear viscosity.

It is a still further object of the present invention to provide a novel tetrapolymer from N-vinyl-2-pyrrolidone, acrylamide, methacrylamide, and an N-alkylamino ester of an ethylenically unsaturated acid.

It is a still further object of the present invention to provide a process for producing high molecular weight vinylpyrrolidone tetrapolymers having a low shear viscosity utilizing an inorganic free radical catalyst.

It is a still further object of the present invention to provide a novel catalyst system for producing high molecular weight, low shear viscosity vinylpyrrolidone tetrapolymers.

The novel flocculant composition of the present invention comprises a tetrapolymer produced by reacting N-vinyl-2-pyrrolidone, acrylamide, methacrylamide, and an N-alkylamine ester of an ethylenically unsaturated acid in the presence of an inorganic free radical catalyst such as tetrapotassium peroxy diphosphate.

While the monomers which comprise the novel tetrapolymer of the present invention may be present in virtually any percentage by weight with respect to each other, the preferred weight proportions are, approximately, 50–80 parts of N-vinyl-2-pyrrolidone, 6–20 parts of acrylamide, 4–20 parts of methacrylamide, and 5–20 parts of the N-alkylamino ester of an ethylenically unsaturated acid corresponding to the formula:

(1) $R^1R^2C=CR^3-(R^4)_n-COO-R^5-NR^6R^7$ wherein $R^1$, $R^2$ and $R^3$ are independently H or $C_{1-2}$ alkyl; $R^4$ is $C_{1-2}$ alkyl; $n$ is 0 or 1; $R^5$ is $C_{2-4}$ alkyl; $R^6$ is $C_{1-12}$ alkyl; $R^7$ is $C_{1-12}$ alkyl, or H when $R^6$ is $C_{3-12}$ alkyl; and $R^6$ and $R^7$ together contain 2–12 alkyl C atoms.

As illustrative of compounds of the above formula operative herein, there may be mentioned: t-butylaminoethyl methacrylate, t-butylamino-ethyl ethacrylate, t-butylamino-ethyl acrylate, isobutylamino-butyl acrylate, isobutylamino-propyl methacrylate, isobutylamino-ethyl ethacrylate, octylamino-ethyl acrylate, dodecylamino-ethyl methacrylate, isohexylaminoethyl ethacrylate, N,N - dimethylamino-ethyl acrylate, (N-methyl-N-propyl)aminoethyl methacrylate, n-pentylamino-ethyl methacrylate, t-butylamino-ethyl vinyl acetate, t-butylamino-ethyl crotonate, t-butylamino-ethyl isocrotonate, N,N-dimethylaminoethyl crotonate, N,N-diethylamino-ethyl isocrotonate, etc.

Generally, the polymerization is conducted in an aqueous solution of the above noted mixture of monomers under conditions fostering the copolymerization through the ethylenically unsaturated groups, i.e., vinyl polymerization. This copolymerization may be induced utilizing free radicals generated from peroxide or azo type polymerization catalysts such as t-butylperoxypivalate or the use of high energy radiation such as gamma radiation or X-rays. It is preferred, however, to utilize an inorganic free radical initiator such as tetrapotassium peroxy diphosphate. Tetrapotassium peroxy diphosphate is especially preferred since the use of this particular catalyst for polymerizing the above noted monomers produces a high molecular weight tetrapolymer with a lower viscosity. These high molecular weight, low viscosity tetrapolymers are not as easily produced by reacting the above noted four monomers utilizing other free radical inorganic sources since many of these other free radical catalysts produce lower molecular weight polymers or produce a high molecular weight polymer from the above noted four monomers, with a generally higher shear viscosity.

The novel tetrapolymer flocculants of the present invention are generally prepared by heating a solution containing the above four monomers at temperatures within the range of from 60–100° C. Although some initial heating must be utilized, since the reaction is exothermic, cooling must often be employed to maintain the temperatures within this range. Furthermore, in order to ensure a high rate of polymerization, avoid run away reactions, and produce a final product with a high molecular weight, it is preferred to carry out the reaction at temperatures within the range of 70–90° C.

Furthermore, the polymerization reaction is generally conducted in the absence of free oxygen and generally under a blanket of inert gas such as nitrogen.

As noted above, the novel tetrapolymers of the present invention have a high molecular weight and a low shear viscosity. While not intending to be bound by any specific theory, this effect is thought to result from the combined effect of the four monomers utilized. In other words, the low viscosity is thought to be a result of the combined effect of the N-alkylamino ester and the methacrylamide. The N-alkylamino ester, with its low solubility in water and limited reactivity with the N-vinyl-2-pyrrolidone, forms a tightly coiled template at the beginning of the polymer chain while the methacrylamide, on the other hand, due to its low reactivity, copolymerizes at the end of the chain. Since these polymeric units are incompatible with poly(N-vinyl-2-pyrrolidone), the methacrylamide units at the end of the chain control the loosely coiled segments of the N-vinyl-2-pyrrolidone-acrylamide copolymer. It should be noted at this point that the viscosity of these tetrapolymers is considerably lower than that of the vinylpyrrolidone-acrylamide copolymer with a similar molecular weight and is considerably lower than the viscosity of the vinylpyrrolidone-acrylamide-N-alkylamino ester terpolymers having a similar molecular weight.

Although the tetrapolymers of the present invention have excellent flocculating activity, this flocculating activity may be further increased by subjecting the tetrapolymers to chemical modifications such as amino methylation (Mannich reaction) or sulphomethylation by reactions well known in the art. Furthermore, the range of flocculating activity may be extended by quaternizing the aminomethylated tetrapolymer with quaternizing agents such as alkyl or aryl halides, sulfates or similar compounds.

The novel polymers of the present invention and the novel process and catalyst system for preparing the same will now be illustrated by way of the following, more specific examples which are for the purposes of illustration only and are in no way to be taken as limiting. In the following examples, all parts and percentages are by weight and all temperatures are in degrees C.

EXAMPLE 1

Some 800 grams of distilled water, 63 grams of N-vinyl-2-pyrrolidone, 7 grams acrylamide, 7 grams methacrylamide, 14 grams t-butylamino-ethyl methacrylate, and 0.33 gram t-butyl peroxy pivalate are placed in a 2 liter resin kettle equipped with a mechanical stirrer, reflux condenser, thermometer, and dropping funnel. The entire system is thoroughly purged with nitrogen and then heated to 60°. Then 50 grams distilled water, 42 grams N-vinyl-2-pyrrolidone, 4.5 grams acrylamide, 4.5 grams methacrylamide and 9 grams t-butylamino-ethyl methacrylate are placed in the dropping funnel. The contents of the dropping funnel are added to the resin kettle within the period of 20 minutes while maintaining the reaction temperature at 60° C. Three hours after the completion of the addition of the contents of the dropping funnel, 0.16 gram t-butylperoxypivalate is added. Following the reaction for 1 hour, an additional 0.16 gram t-butyl-peroxypivalate is again added. Following the completion of the polymerization, the temperature is lowered to 30° C. and the polymer solution is discharged. The analysis of the polymer solution is as follows:

| | |
|---|---|
| Solids _____percent__ | 15.84 |
| Residual monomer _____do____ | 0.12 |
| Conversion _____do____ | 99.8 |
| K value _____ | 124.3 |
| Rel. visc. at 1% _____ | 12.65 |
| Rel. visc. at 0.1% _____ | 3.19 |
| Brookfield viscosity (10%) _____cps__ | 1050 |
| pH _____ | 9.3 |

EXAMPLE 2

Some 1539 grams of distilled water, 239 grams N-vinyl-2-pyrrolidone, 44.5 grams acrylamide, 23.9 grams methacrylamide, 34.2 grams t-butylamino-ethyl methacrylate, and 1.3 grams t-butylperoxypivalate are placed in a 5 liter reaction resin kettle equipped with a mechanical stirrer, reflux condenser, thermometer, and dropping funnel. Following purging with nitrogen, the system is heated to 66° C. and, after the exothermic reaction is completed, the system is cooled to 60° C. at which temperature the addition of the following mixture from the dropping funnel is started: 171 grams distilled water, 159.6 grams N-vinyl-2-pyrrolidone, 29.6 grams acrylamide, 16 grams methacrylamide, and 22.8 grams t-butylamino-ethyl methacrylate. This mixture is added within the period of 20 minutes following which the temperature is increased to 84° C. to promote polymerization. One hour following the addition of the above monomers, the solids content of the solution is adjusted to 20% by adding 570 grams of distilled water. The polymerization is completed by three consecutive additions of 0.7 gram t-butylperoxypivalate catalyst followed by the adjustment of the solids content by adding 950 grams of distilled water. The system is then cooled to room temperature and the polymer solution discharged. Upon analysis, the polymer solution yields are following values:

| | |
|---|---|
| Solids _____percent__ | 15.77 |
| Residual monomer _____do____ | 0.01 |
| Conversion _____do____ | 99.9 |
| K value _____ | 126.2 |
| Rel. viscosity at 1% _____ | 13.50 |
| Rel. viscosity at 0.1% _____ | 2.95 |
| Brookfield viscosity (10%) _____cps__ | 2720 |
| pH _____ | 9.1 |

The tetrapolymers produced in Examples 1 and 2 have excellent flocculating properties and are easily handled and stored.

EXAMPLE 3

Some 49.4 grams of a 40% solution of dimethylamine are placed in a beaker surrounded by an ice bath and 35.6 grams of a 37% formaldehyde solution is added dropwise over a period of 15 minutes. This mixture is placed in a dropping funnel attached to a 2 liter reaction kettle. 1000 grams of the tetrapolymer produced in Example 2 are placed in the kettle and the contents of the dropping funnel is added at a rate such that the temperature in the resin kettle does not exceed 25° C. Following the addition, the temperature is increased to 65° C. and maintained for two hours. The modified polymer solution is then cooled to 25° C. and discharged followed by analysis which reveals the following values:

| | |
|---|---|
| Solids _____percent__ | 16.40 |
| K value _____ | 125.0 |
| Rel. viscosity at 1% _____ | 13.33 |
| Rel. viscosity at 0.1% _____ | 2.65 |
| Brookfield viscosity (10%) _____cps__ | 2000 |
| pH _____ | 9.9 |

This modified tetrapolymer has excellent flocculating properties and is more easily handled and stored than the tetrapolymer produced in accordance with Example 2 since the Brookfield or shear viscosity is somewhat lower.

EXAMPLE 4

The modified tetrapolymer produced in accordance with Example 3 is adjusted to 10% solids and 2 kilograms of this solution is charged into a 1 gallon, glass lined autoclave. The autoclave is sealed and methylchloride is introduced and the temperature raised to 50° C. and maintained for 3 hours. The autoclave is then cooled to 25° C. and the excess methylchloride is removed by pressurizing with nitrogen and venting three times. The autoclave is then opened and the quaternized product is discharged yielding a product with the following values on analysis:

| | |
|---|---|
| Solids _____percent__ | 11.6 |
| K value _____ | 134.5 |
| Rel. viscosity at 1% _____ | 18.32 |
| Rel. viscosity at 0.1% _____ | 3.44 |
| Brookfield viscosity (10%) _____cps__ | 624 |
| pH _____ | 5.5 |

Again, this modified quaternized tetrapolymer has excellent flocculating properties and, as expected, has these flocculating characteristics over a wider pH range. Also, this material is considerably easier to handle and store in view of its low shear viscosity.

EXAMPLE 5

Some 3692 grams of distilled water, 572.5 grams N-vinyl-2-pyrrolidone, 106.7 grams acrylamide, 57.5 grams methacrylamide, and 82.3 grams of t-butylamino-ethyl methacrylate are charged to a 12 liter resin kettle equipped with a mechanical stirrer, reflux condenser, thermometer, gas inlet tube, and graduated dropping funnel. This system is purged with nitrogen and 312 grams t-butylperoxypivalate catalyst are introduced. The reaction kettle is then heated to 66° C. At this time the following monomer solution is then added from the graduated dropping funnel: 111 grams distilled water, 382.7 grams N-vinyl-2-pyrolidone, 70.8 grams acrylamide, 38.5 grams methacrylamide, and 54.5 grams t-butylamino ethyl methacrylate, over the period of 20 minutes. During this addition of monomer solution, the exothermic reaction causes the temperature to rise to 75° C. Following the addition, the temperature is increased to 87° C. and the solids content of the polymer solution is adjusted to 20% by adding 1367 grams distilled water. At this point 1.68 grams t-butyl peroxypivalate are added with 2280 grams of distilled water being added 15 minutes later (this making the solids content 15%). The reaction is continued for one hour, at which time the polymer solution is cooled and discharged and analyzed yielding the following values:

| | |
|---|---:|
| Solids _____percent__ | 15.63 |
| Residual monomer _____do____ | 0.11 |
| K value _____ | 123.8 |
| Rel. viscosity at 1% _____ | 12.39 |
| Rel. viscosity at 0.1% _____ | 2.729 |
| Intr. viscosity at 1% _____ | 3.93 |
| Intr. viscosity at 0.1% _____ | 11.92 |
| Brookfield viscosity (10%) _____cps__ | 1912 |
| pH _____ | 9.3 |

EXAMPLE 6

In a kettle similarly equipped as in Example 5, 3900 grams of distilled water and a mixture of 630 grams N-vinyl-2-pyrrolidone, 116.9 grams acrylamide, 62.9 grams methacrylamide, and 90.0 grams t-butyl-aminoethyl methacrylate are added and stirred until a clear solution is obtained. Then, 2.28 grams of tetrapotassium peroxydiphosphate are added and the system purged thoroughly with nitrogen. The contents of the kettle are then heated to 75° C. for one hour, at which time a monomer solution from the graduated dropping funnel is added. This solution consists of 583 grams distilled water, 420 grams N-vinyl-2-pyrrolidone, 78.2 grams acrylamide, 42.2 grams methacrylamide and 60 grams t-butylamino-ethyl methacrylate. This monomer solution is added in a period of 20 minutes, after which time the reaction is allowed to proceed for one hour. Then, 1500 grams of distilled water are introduced in order to adjust the solids content to 20%. The polymerization is continued for one hour, at which time 1.48 grams of tetrapotassium peroxydiphosphate dissolved in 5 grams of distilled water are added and the reaction continued for an additional hour. This addition of tetrapotassium peroxydiphosphate is again repeated with additional reaction for one hour.

The polymer solution is then cooled and discharged and analyzed to get the following values:

| | |
|---|---:|
| Solids _____percent__ | 20.68 |
| Residual monomer _____do____ | 0.24 |
| K value _____ | 123.3 |
| Rel. viscosity at 1% _____ | 12.20 |
| Rel. viscosity at 0.1% _____ | 3.014 |
| Intr. viscosity at 1% _____ | 3.90 |
| Brookfield viscosity (10%) _____cps__ | 920 |
| pH _____ | 8.9 |

As is apparent with reference to the analysis values for tetrapolymer produced in Example 5 and that produced in Example 6, the use of the tetrapotassium peroxydiphosphate as the free radical initiator catalyst produces a tetrapolymer with a considerably reduced Brookfield or shear viscosity. The tetrapolymers produced in accordance with Examples 5 and 6 both have excellent flocculating properties while the tetrapolymer produced in Example 6 is considerably easier to handle and store due to its shear viscosity being so much lower.

EXAMPLE 7

Using the procedure and proportions of Example 6, the t-butyl-aminoethyl methacrylate is replaced by an equivalent amount of the following:
 (a) t-butylamino-ethyl acrylate;
 (b) dodecylamino-ethyl acrylate;
 (c) t-butylamino-ethyl crotonate;
 (d) t-butylamino-ethyl ethacrylate;
 (e) diethylamino-ethyl isocrotonate;
 (f) dimethylamino-butyl crotonate; and
 (g) ethylpropylamino-ethyl methacrylate.

Each of the resulting tetrapolymers has a high molecular weight and good flocculating activity and a generally low shear viscosity.

What is claimed is:
1. A flocculant composition comprising a high molecular weight, low viscosity tetrapolymer consisting essentially of approximately by weight (1) 50–80 parts N-vinyl-2-pyrrolidone, (2) 6–20 parts acrylamide, (3) 4–20 parts methacrylamide, and (4) 5–20 parts of an N-alkylamino ester of an ethylenically unsaturated acid corresponding to the formula:
 (1)    $R^1R^2C=CR^3-(R^4)_n-COO-R^5-NR^6R^7$
wherein $R^1$, $R^2$ and $R^3$ are independently H or $C_{1-2}$ alkyl; $R^4$ is $C_{1-2}$ alkyl; $n$ is 0 or 1; $R^5$ is $C_{2-4}$ alkyl; $R^6$ is $C_{1-12}$ alkyl; $R^7$ is $C_{1-12}$ alkyl, or H when $R^6$ is $C_{3-12}$ alkyl; and $R^6$ and $R^7$ together contain 2–12 alkyl C atoms.

2. The composition of claim 1 wherein monomer (4) is t-butylaminoethyl methacrylate.

3. A flocculant composition comprising the aminomethyl substituted tetrapolymer of claim 1.

4. A flocculant composition comprising the quaternized aminomethyl substituted tetrapolymer of claim 1.

References Cited

UNITED STATES PATENTS 3,006,900  10/1961  Finkentscher et al. ____ 260—78

STANFORD M. LEVIN, Primary Examiner

U.S. Cl. X.R.

260—29.6 TA